(12) United States Patent
Vaikuntanathan et al.

(10) Patent No.: US 9,281,944 B2
(45) Date of Patent: Mar. 8, 2016

(54) ATTRIBUTE BASED ENCRYPTION USING LATTICES

(71) Applicant: Microsoft Technology Licensing, LLC, Redmond, WA (US)

(72) Inventors: Vinod Vaikuntanathan, Seattle, WA (US); Panagiotis Voulgaris, San Diego, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 107 days.

(21) Appl. No.: 14/152,312

(22) Filed: Jan. 10, 2014

(65) Prior Publication Data

US 2014/0129845 A1    May 8, 2014

Related U.S. Application Data

(62) Division of application No. 12/972,420, filed on Dec. 17, 2010, now Pat. No. 8,634,563.

(51) Int. Cl.
*H04L 9/30* (2006.01)
*H04L 9/08* (2006.01)
*G06F 21/72* (2013.01)

(52) U.S. Cl.
CPC .............. *H04L 9/3093* (2013.01); *G06F 21/72* (2013.01); *H04L 9/088* (2013.01); *H04L 9/0825* (2013.01); *H04L 9/0861* (2013.01); *H04L 9/0894* (2013.01)

(58) Field of Classification Search
CPC .................................................. H04L 9/3093
See application file for complete search history.

(56) References Cited

U.S. PATENT DOCUMENTS

| | | | |
|---|---|---|---|
| 6,252,959 B1 | 6/2001 | Paar et al. | |
| 7,003,117 B2 | 2/2006 | Kacker et al. | |
| 7,580,521 B1 * | 8/2009 | Spies | H04L 9/3073 380/281 |
| 7,634,085 B1 * | 12/2009 | Sahai | H04L 9/3073 380/255 |
| 7,957,525 B2 * | 6/2011 | Gentry | H04L 9/0643 380/28 |
| 7,961,879 B1 * | 6/2011 | Spies | H04L 9/3073 380/281 |
| 8,370,621 B2 * | 2/2013 | Raykova | H04L 9/008 380/255 |
| 8,634,563 B2 | 1/2014 | Vaikuntanathan et al. | |
| 2005/0094806 A1 | 5/2005 | Jao et al. | |
| 2006/0045269 A1 * | 3/2006 | Freedman | B82Y 10/00 380/264 |
| 2006/0159259 A1 * | 7/2006 | Gentry | H04L 9/0643 380/42 |
| 2008/0263363 A1 | 10/2008 | Jueneman et al. | |

(Continued)

OTHER PUBLICATIONS

Pirretti et al.; Secure attribute-based systems; Published in: Proceeding CCS '06 Proceedings of the 13th ACM conference on Computer and communications security; 2006; pp. 99-112; ACM Digital Library.*

(Continued)

*Primary Examiner* — Bradley Holder
(74) *Attorney, Agent, or Firm* — Sandy Swain; Micky Minhas

(57) ABSTRACT

A master public key is generated as a first set of lattices based on a set of attributes, along with a random vector. A master secret key is generated as a set of trap door lattices corresponding to the first set of lattices. A user secret key is generated for a user's particular set of attributes using the master secret key. The user secret key is a set of values in a vector that are chosen to satisfy a reconstruction function for reconstructing the random vector using the first set of lattices. Information is encrypted to a given set of attributes using the user secret key, the given set of attributes and the user secret key. The information is decrypted by a second user having the given set of attributes using the second user's secret key.

12 Claims, 9 Drawing Sheets

(56) References Cited

U.S. PATENT DOCUMENTS

| | | | | |
|---|---|---|---|---|
| 2009/0132903 | A1* | 5/2009 | Zare | G06F 17/30592 715/211 |
| 2010/0008496 | A1* | 1/2010 | Gentry | H04L 9/0643 380/28 |
| 2010/0054477 | A1* | 3/2010 | Chew | G06F 21/6209 380/277 |
| 2010/0185861 | A1* | 7/2010 | Chase | H04L 9/083 713/171 |
| 2011/0320809 | A1* | 12/2011 | Amendola | H04L 9/088 713/158 |
| 2012/0224692 | A1* | 9/2012 | Karlov | H04L 9/3073 380/255 |
| 2012/0260094 | A1* | 10/2012 | Asim | G06F 21/10 713/171 |

OTHER PUBLICATIONS

Boneh et al.; On the Impossibility of Basing Identity Based Encryption on Trapdoor Permutations; Published in: Foundations of Computer Science, 2008. FOCS '08. IEEE 49th Annual IEEE Symposium on; Date of Conference: Oct. 25-28, 2008; pp. 283-292; IEEE Xplore.*

Prosecution History for U.S. Appl. No. 12/972,420 including: Issue Notification dated Dec. 31, 2013, Examiner-Initiated Interview Summary dated Sep. 13, 2013, Notice of Allowance dated Sep. 13, 2013, Amendment dated Jun. 28, 2013, Non-Final Office Action dated Feb. 15, 2013, Response to Restriction Requirement dated Dec. 3, 2012, Requirement for Restriction/Election dated Nov. 28, 2012, Application and Drawings filed Dec. 17, 2010, 74 pages.

"Basic tools in lattice-based cryptography", Retrieved at <<http://people.csail.mit.edu/joanne/crypto-abstracts.html>>, Aug. 4, 2010, pp. 7.

Micciancio, et al., "Lattice-based Cryptography", Retrieved at <<http://www.math.uni-bonn.de/~saxena/courses/WS2010-ref5.pdf>>, Jul. 22, 2008, pp. 33.

Raju et al., "Elliptic Curve Cryptosystem and its Applications", Retrieved at <<http://citeseerx.ist.psu.edu/viewdoc/downloand?doi=10.1.1.1162.215&rep=rep1&type=pdf>>, 2003, pp. 1540-1543.

Huiyan, Chen, "CCA-Secure Cryptosystem from Lattice", Retrieved at <<http://eprint.iacr.org/2010/127.pdf>>,—Retrieved Date: Oct. 6, 2010, pp. 15.

Sahai et al., "Fuzzy Identity-Based Encryption", Retrieved at <<http://eprint.iacr.org/2004/086.pdf>>, 2004, pp. 15.

Goyal et al., "Attribute-Based Encryption for Fine-Grained Access Control of Encrypted Data", Retrieved at <<http://citeseerx.ist.psu.edu/viewdoc/download?doi=10.1.1.61.7102&rep=rep1&type=pdf>>, 2006, pp. 28.

Lewko et al., "Fully Secure Functional Encryption: Attribute-Based Encryption and (Hierarchical) Inner Product Encryption", Retrieved at <<http://citeseerx.ist.psu.edu/viewdoc/download?doi=10.1.1.165.2844&rep=rep1&type=pdf>> 2010, pp. 56.

Gentry et al., "Trapdoors for Hard Lattices and New Cryptographic Constructions", Retrieved at <<http://people.csail.mit.edu/vinodv/trapcvp.pdf, Nov. 18, 2007, pp. 38.

"Generating Shorter Bases for Hard Random Lattices", Retrieved at <<http://www.cc.gatech.edu/~cpeikert/pubs/shorter.pdf>>, Jul. 10, 2010, pp. 18.

* cited by examiner

ATTRIBUTE BASED ENCRYPTION USING LATTICES

CROSS-REFERENCE TO RELATED APPLICATION

The present application is a divisional of and claims priority of U.S. patent application Ser. No. 12/972,420, filed Dec. 17, 2010, the content of which is hereby incorporated by reference in its entirety.

BACKGROUND

Data encryption has been employed using a public and private key architecture. In such an architecture, a public key is generated and published, and a private or secret key is also generated and secretly shared with those entities that are allowed to decrypt data. When data is encrypted, it is encrypted using the public key and the only entity that can decrypt the data is one who has the private key.

Attribute based encryption is a type of encryption that is commonly employed in an environment where a message is encrypted, but the entity that encrypts the message does not necessarily know who will be accessing the data. For instance, in a company or other similar organization, it may be common for a person in the organization to encrypt data so that it can only be viewed by people with sufficient credentials. By way of example, assume that a Vice President of Personnel encrypts a memorandum or other item of information which is only to be viewed by persons on the Vice President's personnel team and the Human Resource Director. Regardless of the specific names of those people, the Vice President may want to encrypt the data so that only that group of individuals (whoever they are), with the appropriate credentials, can view the encrypted information. This is sometimes referred to as credential-based encryption. More generally, the data can be encrypted to any predefined set of attributes. The data is encrypted to a first set of attributes, and the entity that is decrypting the data need only have attributes that are sufficiently close to the first set of attributes. If they are, then the decrypting entity can decrypt the data.

In attribute-based encryption, the user's key and ciphertext is labeled with attributes. The user is only allowed to decrypt the ciphertext if the user's key has attributes that sufficiently overlap with attributes on the label of the ciphertext.

Another type of attribute-based encryption is referred to as "key policy attribute-based encryption" (KP-ABE). In KP-ABE, each user's private key has an associated access structure which specifies the type of ciphertext the key can decrypt. If the user's access structure is sufficiently close to that specified by the ciphertext, and if the user's key has attributes that are sufficiently close to the attributes on the label of the ciphertext, then the user can decrypt the ciphertext.

Some work is currently being done in quantum computing. Quantum computing uses the principles of quantum mechanics to represent and manipulate data. Though quantum computers are not yet commercially available, it is believed that quantum computers will be available within the reasonably near future.

Quantum computers will likely be able to solve many current encryption problems. That is, a quantum computer will likely be able to break a great many current encryptions systems, so that they will no longer be secure.

The discussion above is merely provided for general background information and is not intended to be used as an aid in determining the scope of the claimed subject matter.

SUMMARY

A master public key is generated as a first set of lattices based on a set of attributes, along with a random vector. A master secret key is generated as a set of trap door lattices corresponding to the first set of lattices. A user secret key is generated for a user's particular set of attributes using the master secret key. The user secret key is a set of values in a vector that are chosen to satisfy a reconstruction function for reconstructing the random vector using the first set of lattices. Information is encrypted to a given set of attributes using the user secret key, the given set of attributes and the user secret key. The information is decrypted by a second user having the given set of attributes using the second user's secret key.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
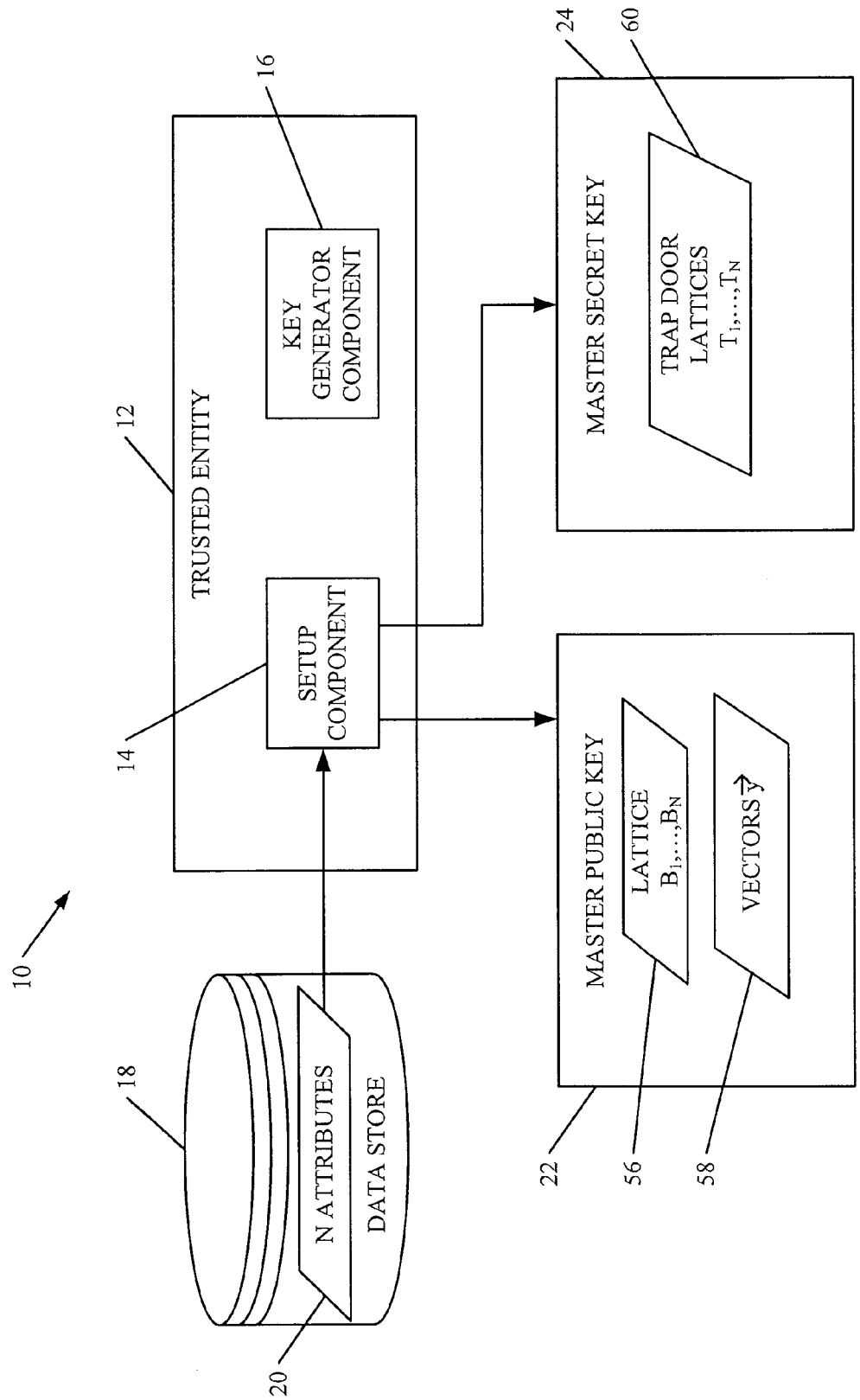
FIG. 1 is a block diagram of an encryption system in accordance with one embodiment.

FIG. 1 shows a block diagram of one embodiment of a system 10 for generating keys used in an encryption architecture. System 10 includes trusted entity 12 that has a setup component 14 and a key generator component 16. System 10 shows that trusted entity 12 has access to data store 18 that has access to a stored group of N attributes 20. Trusted entity 12 accesses attributes 20 and uses setup component 14 to generate both master public key 22 and master secret key 24. Trusted entity 12 is illustratively an entity that can be trusted to keep master secret key 24 secret and to generate master public key 22 for use in an encrypting data. For the sake of example only, trusted entity 12 will be described in terms of a security component in an organization, such as a company. Of course, trusted entity 12 can be any desired entity such as a government entity, a private entity or other entity.

While attributes 20 can be any desired attributes, they will be described, for the sake of example only, as a set of credentials used by trusted entity 12 to generate master public key 22 and master secret key 24. The credentials may be, for example, attributes or items of information that identify an entity that will be accessing encrypted information, that is encrypted using master public key 22. It will be appreciated, of course, that attributes 20 can be any other attributes, instead of credentials. For instance, attributes 20 can be biometric attributes, such as physical characteristics that describe a person's retinal scan, fingerprints, or other identifying information. Similarly, attributes 20 can be any other attributes that may be used for encrypting data in an attribute-based encryption architecture.

Figure 2:
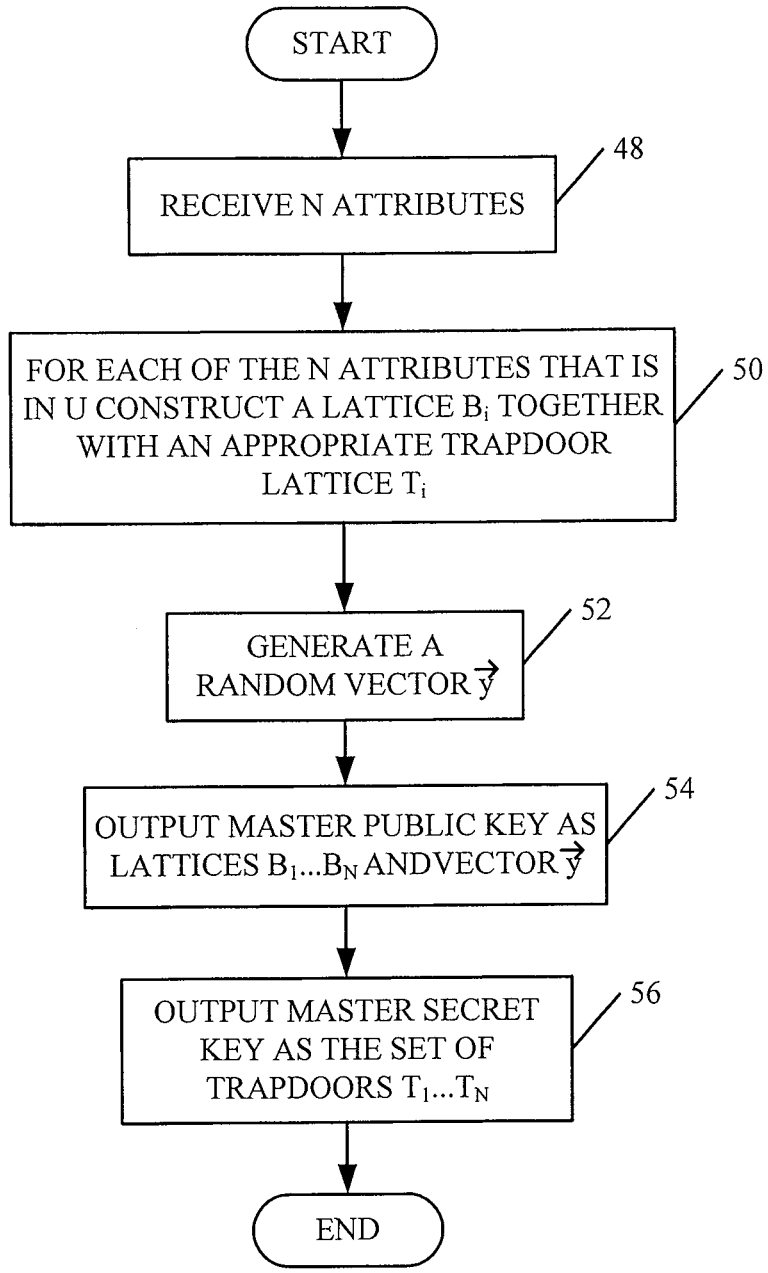
FIG. 2 is a flow diagram illustrating one embodiment of the operation of the system shown in FIG. 1 to generate a master public key and a master secret key.

In any case, before data can be encrypted in the system described herein, trusted entity 12 first runs a setup routine using setup component 14. One embodiment of the setup routine is shown in FIG. 2, and it is used to generate master public key 22 and master secret key 24. In the embodiment shown in FIGS. 1 and 2, setup component 14 is generating master public key 22 and master secret key 24 for a given set U of the N attributes 20. That is, the master public key 22 and the master secret key 24 can be used to encrypt data for any subset of the U attributes in the set of attributes.

First, setup component 14 receives the set of U attributes that are to be used in generating the master public key 22 and the master secret key 24. This is indicated by block 48 in FIG. 2. The U attributes can be retrieved by setup component 14, from data store 18, one at a time, or a set at a time, or they can be loaded into an internal memory of setup component 14.

In any case, once the U attributes are received, or accessed, then for each attribute i that is in U, setup component 14 constructs a lattice $B_i$ together with an appropriate trap door lattice $T_i$. For purposes of the present description, lattices are geometric objects that can be pictorially described as the set of intersection points of a regular (but not necessarily orthogonal) n-dimensional infinite grid. Lattices can be specified by a basis (that is n linearly independent vectors) such that any lattice point can be obtained as an integer linear combination of the basis vectors. The same lattice (that is, the same set of intersection points) can be represented by several different bases. A short basis of a lattice is a basis in which all vectors are relatively short. In one embodiment herein, the short basis of the generated lattice serves as the trap door function. Also, in one embodiment, for the trap door functions every output value has several pre-images. A trap door inversion algorithm generates an output that samples from among the pre-images under an appropriate distribution.

In order to generate the lattice $B_i$, together with the trap door lattice $T_i$, in one embodiment, setup component 14 uses an algorithm for generating a hard random lattice along with a relatively short basis. The lattice is represented in Hermite Normal Form which is a computable, unique canonical representation of an integer lattice. The length of the output basis is illustratively asymptotically optimum (that is $O\sqrt{m}$) where m is the dimension of the output lattice $B_i$). Generating the lattice $B_i$ and the appropriate trap door lattice $T_i$, for each i that is in U is indicated by block 50 in FIG. 2.

Setup component 14 then generates a random vector $\vec{y}$. This is indicated by block 52 in FIG. 2.

The setup component 14 then outputs master public key 22 and master secret key 24. This is indicated by block 54 in FIG. 2. The master public key is comprised of lattices $B_1, \ldots, B_N$, 56 and vectors $\vec{y}$, 58 that are generated for each of the N attributes in U. Master secret key 24 is comprised of the trap door lattices $T_1, \ldots, T_N$, 60. Outputting the master secret key is indicated by block 56 in FIG. 2. The master public key is published for those wishing to encrypt data, while the master secret key is maintained secret by trusted entity 12. Both keys 22 and 24 are used to generate secret keys for users, which desire to decrypt data encrypted using the master public key.

The operation of the system shown in FIG. 1 in running the setup algorithm is illustrated as follows:

SETUP Setup(λ)

Master Secret Key: $\{T_i\}$            Eq. 1

Master Public Key: $\forall i \in U, \{B_i\}, y$         Eq. 2

This shows that the master public key is generated by generating a random vector $\vec{y}$, and, for each i that is an element of U, the lattice $B_i$ is generated. Similarly, the master secret key 24 is output as the trap door lattice $T_i$.

Figure 3:
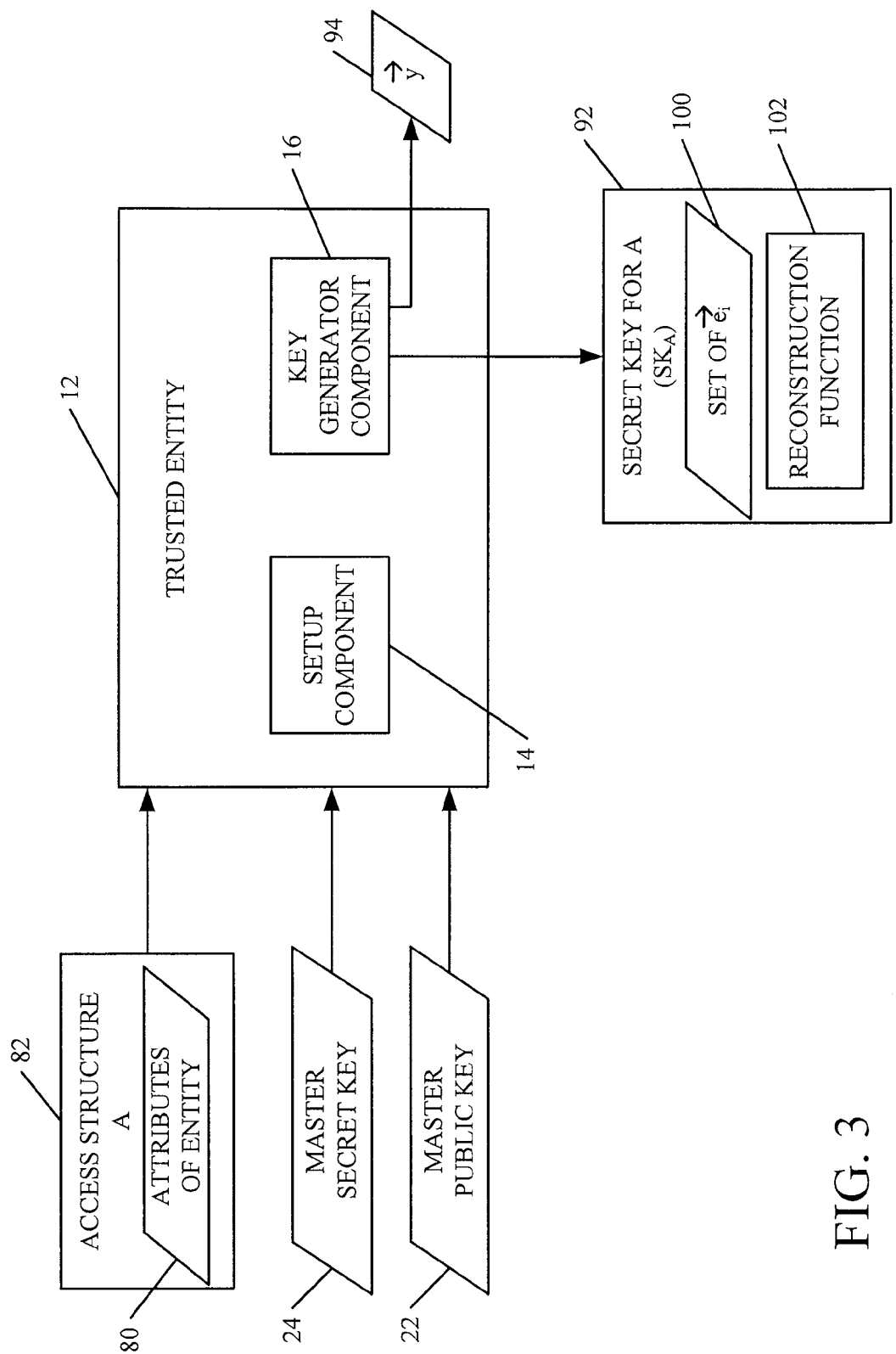
FIG. 3 is a block diagram of the system shown in FIG. 1 for generating a user's secret key.

FIG. 3 shows one illustrative block diagram of the trusted entity 12 used for generating a secret key for a given user. Similar items are similarly numbered to those shown in FIG. 1.

In the example application discussed above with respect to FIG. 1, assume now that an employee of the organization that uses trusted entity 12 wishes to decrypt things that another person or entity encrypts to that employee's credentials. The employee illustratively provides the attributes 80 that define the employee. The attributes 80 are indicated as the attributes of an entity in FIG. 3. In the embodiment being discussed, those attributes illustratively include the credentials of the employee who wishes decrypt information. Again, however, in other applications the attributes may be biometric data, or any other desired attributes that are used to limit the particular set of users that can decrypt any given encrypted data.

Figure 4:
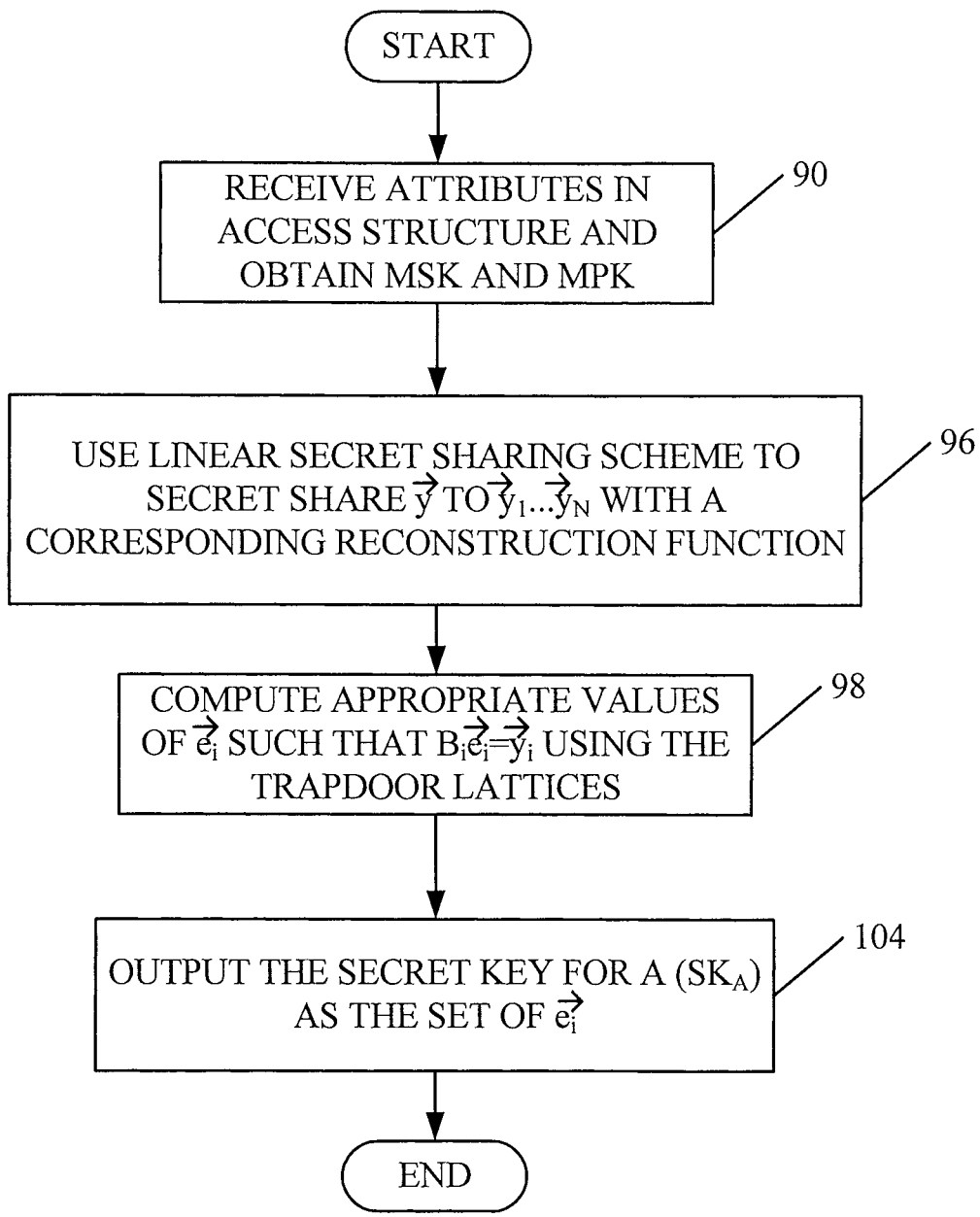
FIG. 4 is a flow diagram illustrating the operation of the system shown in FIG. 3, in accordance with one embodiment.

FIG. 4 is a flow diagram illustrating one embodiment of the operation of the system shown in FIG. 3, for generating a secret key 92 for an access structure A. FIGS. 3 and 4 are described together. In the embodiment shown in FIG. 3, attributes 80 are provided in an access structure A, 82. The access structure A, 82 illustratively includes a set of allowed subsets of the universe of attributes and also specifies the type of ciphertext that the user's secret key will be able to decrypt. Trusted entity 12 first receives attributes 80 in access structure A, 82, and also accesses master secret key 24 and master public key 22 that were generated as described above with respect to FIG. 2. This is indicated by block 90 in FIG. 4. Key generator component 16 then runs a key generation algorithm to generate a secret key ($SK_A$) 92 for the access structure A, 82.

Key generator component 16 then secret shares the vector $\vec{y}$ into N vectors $\vec{y}_1, \ldots, \vec{y}_N$. Vector $\vec{y}$ is illustrated as 94 in FIG. 3 and secret sharing it, along with its corresponding reconstruction function, is indicated by block 96 in FIG. 4. In one embodiment, key generator component 16 secret shares the vector $\vec{y}$ using a linear secret sharing scheme. The linear secret sharing scheme shares a secret among a set of entities so that only certain specified subsets (qualified groups) of the entities are able to reconstruct the secret while smaller subsets (forbidden groups) have no information about the secret. Therefore, key generator component 16 secret shares the vector $\vec{y}$.

Key generator component 16 then computes appropriate values for a set of vectors $\vec{e}_i$ such that B $\vec{e}_i = \vec{y}_i$. This is illustratively computed by key generator component 16 using the trapdoor lattices $T_i$. Generating the appropriate values for $\vec{e}_i$ is indicated by block 98 in FIG. 4.

Key generator component 16 then outputs the secret key $SK_A$, 92 for the access structure A, 82. The secret key for A ($SK_A$) is comprised of the set of values $e_i$, 100 along with the reconstruction function 102. The vector $\vec{y}$ is secret shared, and the reconstruction function is available to all entities. Outputting the secret key $SK_A$, 92 is indicated by block 104 in FIG. 4. The key generation algorithm is also indicated as follows:

Key Generation KEYGEN(MSK, MPK, A)

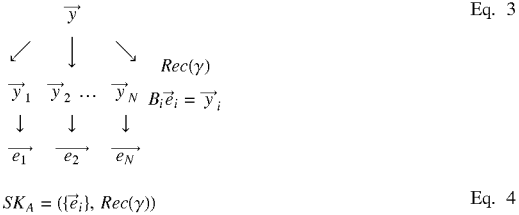

$$SK_A = (\{\vec{e}_i\}, Rec(\gamma)) \qquad \text{Eq. 4}$$

This indicates that the vector $\vec{y}$ is used, along with the lattices, in order to generate the appropriate values for $\vec{e}$. The vector $\vec{y}$ is secret shared along with the reconstruction function $Rec(\gamma)$. The secret key for a given access structure A is comprised of the values $\vec{e}_i$ and the reconstruction function $\gamma$.

Figure 5:
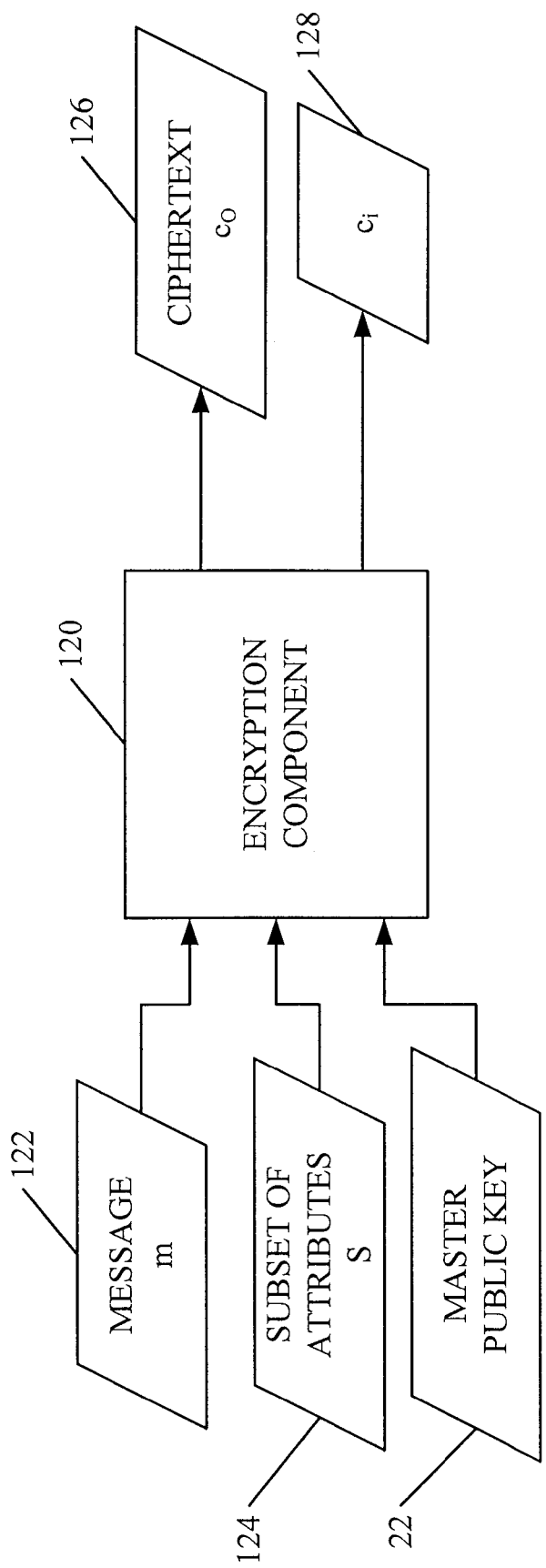
FIG. 5 is a block diagram of one embodiment of an encryption component.

FIG. 5 is a block diagram illustrating an encryption component 120. Encryption component 120 is used by a user who wishes to encrypt a message m, 122, to entities who have a subset of attributes S, 124. Encryption component 120 uses master public key 22. Encryption component 120 generates ciphertext $c_0$, 126, which is an encrypted form of message 122. Encryption component 120 also generates values $\vec{c}_i$, 128, which are used in decrypting ciphertext $c_0$.

Figure 6:
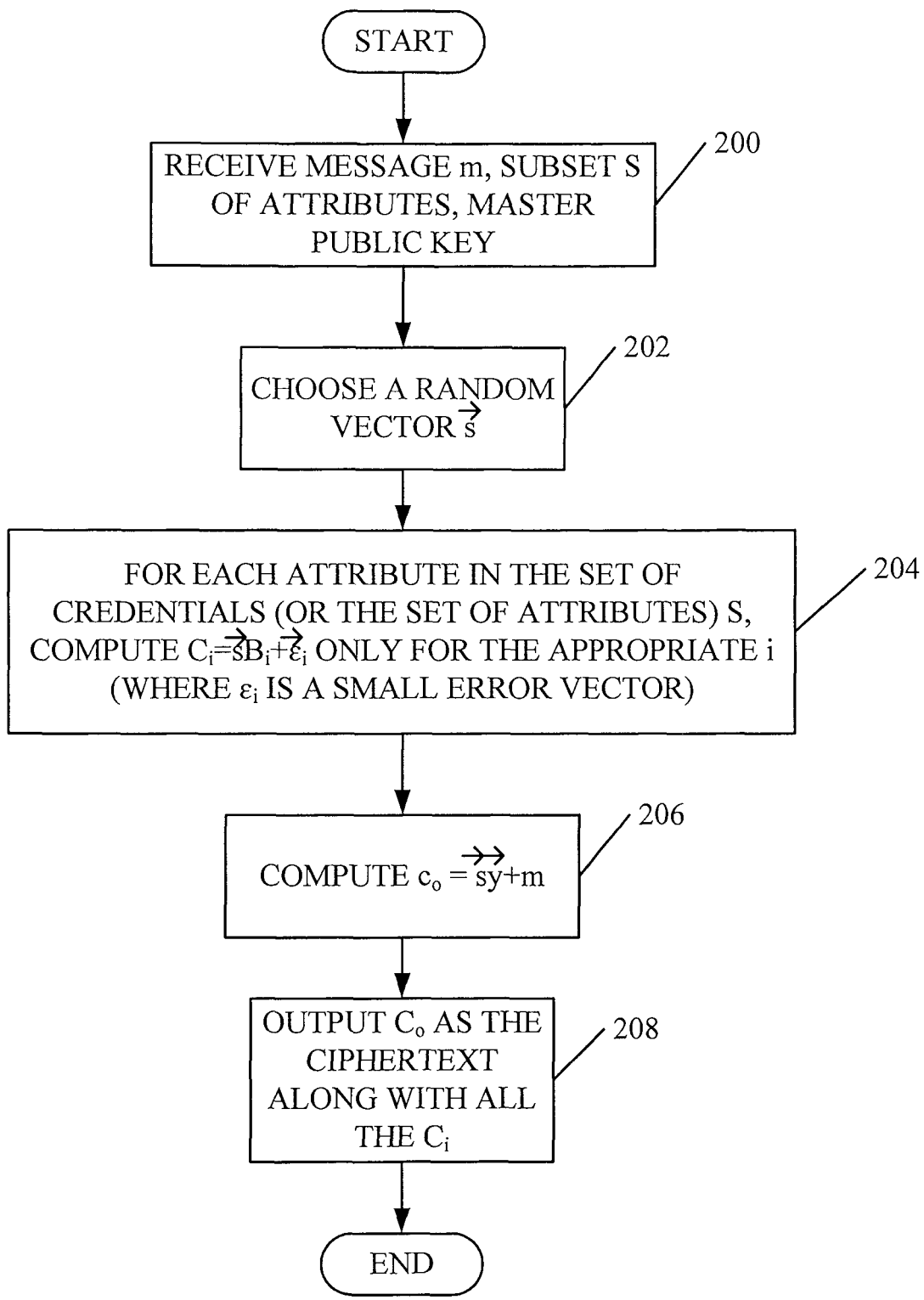
FIG. 6 is a flow diagram illustrating one embodiment of the operation of the component shown in FIG. 5.

FIG. 6 is a flow diagram illustrating one embodiment of the operation of the system shown in FIG. 5 in encrypting message m, 122. Encryption component 120 first receives message m, 122 along with the subset of attributes S, 124, to which message m is to be encrypted. Encryption component 120 then accesses master public key 122. This is indicated by block 200 in FIG. 6. Encryption component 120 then chooses a random vector $\vec{s}$. This is indicated by block 202 in FIG. 6.

Then, for each attribute in the set of attributes (or set of credentials) S, encryption component 120 computes $\vec{c}_i = \vec{s}B_i + \vec{\in}_i$ only for the appropriate i, and where $\in_i$ is a small error vector that can be ignored. This is indicated by block 204 in FIG. 6. It can be seen that $\vec{s}B_i$ is a multiplication of a vector $\vec{s}$ with a matrix $B_i$. In other words, if the message is being encrypted to the attributes (or credentials) of a particular entity, then the i corresponding to that entity is used to calculate $\vec{c}_i$. If the message is being encrypted for two or more different attributes for an entity then the ciphertexts $c_i$ are calculated for each of the two or more different i's.

Encryption component 120 then computes the ciphertext $c_0 = \vec{s} \cdot \vec{y} + m$. It will be noted that $\vec{s} \cdot \vec{y}$ is the inner product of two vector $\vec{s}$ and $\vec{y}$. This is indicated by block 206 in FIG. 6.

Encryption component 120 then outputs as the ciphertext $c_0$, 126 along with $\vec{c}_i$, 128. This is indicated by block 208 in FIG. 6. The message m has now been encrypted into ciphertext $c_0$ together with auxiliary ciphertexts $c_i$ for each attribute i in the subset of attributes (or subset of credentials) S, 124 for which the message is intended. Again, in discussing the example referred to with respect to the above Figures, assume that the set of credentials S for which message m is encrypted define a group of employees, or a management team, etc., who are to have access to the message m.

Encryption of the message using the master public key can be described mathematically as follows:
Encryption ENC(MPK, S, M)

$$\forall_i \in S: \vec{c}_i = \vec{s}B_i + \vec{\varepsilon}_i \qquad \text{Eq. 5}$$

$$c_0 = \vec{s}\vec{y} + m \qquad \text{Eq. 6}$$

For each attribute i in the set of attributes or credentials S for which the message is to be encrypted, the vector $\vec{c}_i$ is calculated, as is the ciphertext $c_0$.

Figure 7:
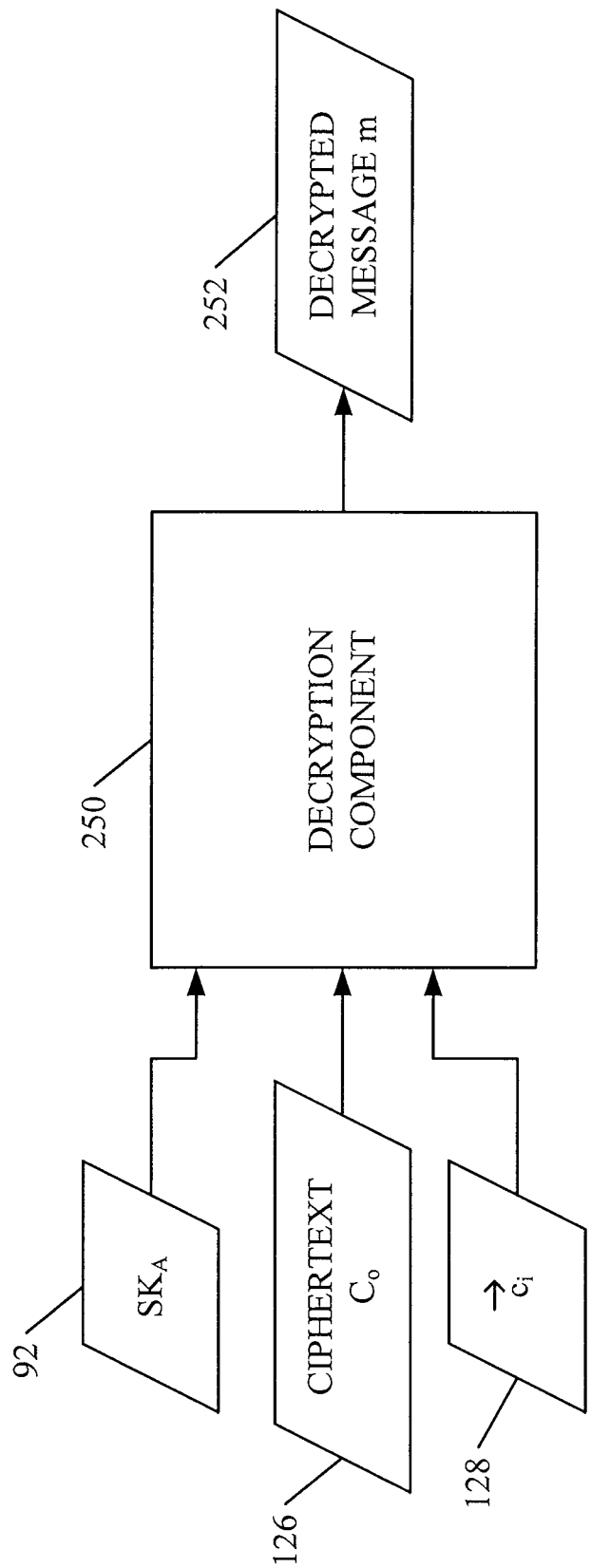
FIG. 7 is a block diagram of one embodiment of a decryption component.
Figure 8:
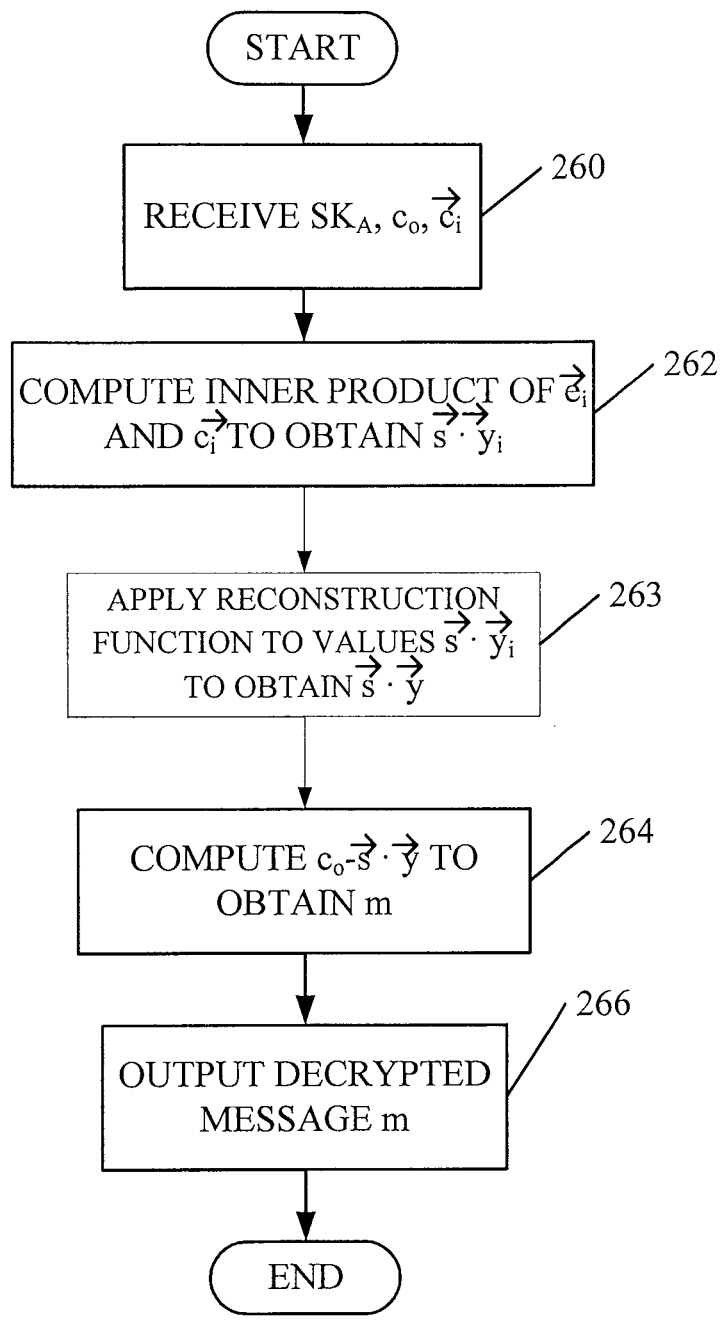
FIG. 8 is a flow diagram illustrating one embodiment of the operation of the component shown in FIG. 7.

FIG. 7 is a block diagram of one illustrative embodiment of a decryption component 250. Decryption component 250 receives the secret key for access structure $SK_A$, 92, along with ciphertext $c_0$, 126 and vector $\vec{c}_i$, 128 and decrypts ciphertext $c_0$ to obtain decrypted message m, 252. FIG. 8 is a block diagram of one illustrative embodiment of the operation of decryption component 250 shown in FIG. 7.

Again, in keeping with the example discussed with respect to the above Figures, assume now that a desired recipient of the message m wishes to decrypt the message m. The recipient has already received the secret key $SK_A$ and it is assumed that the access structure A for $SK_A$ has attributes which match the ciphertext $c_0$, such that the holder of $SK_A$ can access the encrypted message. Decryption component 250 first receives $SK_A$, $c_0$ and $\vec{c}_i$. This is indicated by block 260 in FIG. 8.

Decryption component 250 then computes an inner product of $\vec{e}_i$ and $\vec{c}_i$ to obtain $\vec{s} \cdot \vec{y}_i$. This is indicated by block 262 in FIG. 8.

The reconstruction function of the linear secret sharing scheme is then applied to the values $\vec{s} \cdot \vec{y}$. This is indicated by block 263. The reconstruction function success in computing $\vec{s} \cdot \vec{y}$. If and only if, the subset S of attributes associated with the ciphertext satisfies the access structure A.

Decryption component 250 then computes $c_0 - \vec{s} \cdot \vec{y}$ to obtain the decrypted message m and outputs the decrypted message m, 252. This is indicated by blocks 264 and 266 in FIG. 8. This is done as follows. Decryption component 250 receives $\vec{c}_i$. It is known that:

$$\vec{c}_i \approx \vec{s}B_i \qquad \text{Eq. 7}$$

This is approximately equal because there is a small, but negligible, error included.

And it is also known that:

$$\vec{y}_i = B_i \vec{e}_i \qquad \text{Eq. 8}$$

Therefore, $$\vec{c}_i \vec{e}_i \approx \vec{s}B_i \vec{e}_i = \vec{s}\vec{y}_i \qquad \text{Eq. 9}$$

Since a particular user's secret key $SK_A$ contains the vectors $\vec{e}_i$ together with the reconstruction function, if the user is given $\vec{c}_i$ and $c_0$, the user can obtain m as follows:

First, compute $\vec{s} \cdot \vec{y}_i$ as above (namely multiply $\vec{c}_i$ by $\vec{e}_i$, which as shown in Eq. 9 is approximately equal to $\vec{s} \vec{y}_i$).

Then, apply the linear reconstruction function to values $\vec{s}\vec{y}_i$ to reconstruction $\vec{s}\vec{y}_i$ where $\vec{y}$ is the vector that is part of the public parameter.

Since $$c_o = \vec{s}\vec{y} + m \quad \text{Eq. 10}$$

Then $$c_o - \text{Reconstruct}\{\vec{c}_i \vec{e}_i\} \approx c_o - \vec{s}\vec{y} = \vec{s}\vec{y} + m - \vec{s}\vec{y} \quad \text{Eq. 11}$$

$$= m \quad \text{Eq. 12}$$

Find $\vec{s}\vec{y}$ and subtract from $c_o$ to get an approximate version of m. Standard tools of error correction and approximation can then be used to recover the message m in its exact form.

The decryption component can be mathematically described as follows.

Decryption Dec($SK_A$, $C_\gamma$, m)

$\forall_i \in S: \vec{c}_i \vec{e}_i = \vec{s}_i \vec{y}_i + \in_i$

If $S \in A$,

Rec($\gamma$)={$r_i$}

Find: $\vec{s}\vec{y}_i + m$

Figure 9:
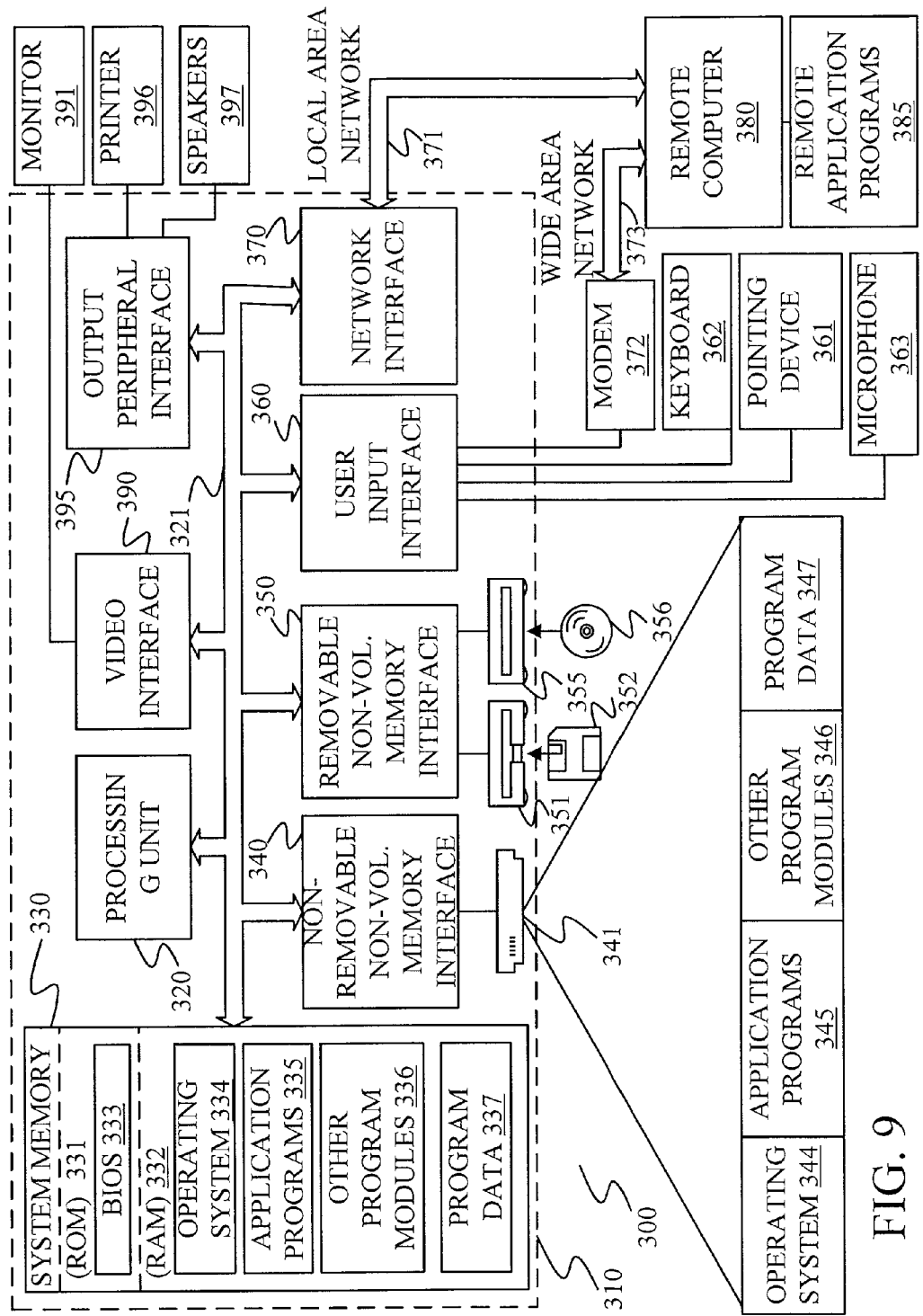
FIG. 9 is a block diagram of one illustrative computing environment which can be used in embodiments described herein.

FIG. 9 is one illustrative block diagram of a computing environment which can be used to implement trusted entity 12, setup component 14, key generator 16, encryption component 120, and/or decryption component 250. The various items of data can be stored in any of the data storage or computer readable storage media described in FIG. 9. Trusted entity 12, setup component 14, key generator 16, encryption component 120 and decryption component 250 can be implemented in silicon, or stored on computer readable media, and can be modules which are activated by processing unit 320. The processing unit 320 can be activated by these modules to facilitate performance of the various functions associated with the modules.

FIG. 9 is one embodiment of a computing environment in which the invention can be used. With reference to FIG. 9, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 9 illustrates operating system 334, application programs 335, other program modules 336, and program data 337.

The computer 310 may also include other removable/non-removable volatile/nonvolatile computer storage media. By way of example only, FIG. 9 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 9, provide storage of computer readable instructions, data structures, program modules and other data for the computer 310. In FIG. 9, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. They can also include search components 302 and 304.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 9 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 9 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for performing attribute based encryption of information, comprising:
    setup logic that receives a set of allowed attributes to which the information can be encrypted and, for each attribute in the set of allowed attributes, generates a lattice B and a trap door lattice T as well as a random vector y, and outputs the lattice B and vector y as a master public key and maintains the trap door lattice T as a master secret key;
    key generator logic that receives a set of user attributes that corresponds to a user, in an access structure, the access structure identifying a type of information the user can decrypt, the key generator secret sharing the vector y with the user and generating a user secret key for the access structure and the set of user attributes, based on the master public key and the master secret key, the user secret key including a set of values in a vector e that satisfies a reconstruction function for reconstructing y, given lattice B, the user secret key being output for encrypting messages;
    encryption logic that receives a message m to be encrypted and generates an encrypted form of the message m to a predefined subset of attributes using the master public key; and
    a computer processor, being a functional part of the system, and activated by the setup logic and the key generator logic to facilitate outputting the master public key and the user secret key.

2. The system of claim 1 wherein the key generator generates vector e such that eB=y, where eB is a multiplication of a vector with a lattice.

3. The system of claim 2 wherein the encryption logic selects a random vector s and computes a value c for each given attribute in the predefined subset of attributes, the value c including a multiplication of random vector s with lattice B for the given attribute.

4. The system of claim 3 wherein the encryption logic computes a ciphertext for message m as an inner product of random vector s and y for the given attribute.

5. The system of claim 4 wherein the encryption logic outputs the value c and the ciphertext as the encrypted form of message m.

6. The system of claim 5 and further comprising:
    decryption logic that receives the decrypted form of the message m and decrypts the encrypted form of the message m using the user secret key.

7. A method for performing attribute based encryption of information, the method comprising:
    receiving a set of allowed attributes to which the information can be encrypted;
    for each attribute in the set of allowed attributes, generating a lattice B and a trap door lattice T as well as a random vector y, outputting the lattice B and vector y as a master public key, and maintaining the trap door lattice T as a master secret key;
    receiving a set of user attributes that corresponds to a user, in an access structure, the access structure identifying a type of information the user can decrypt and the vector y being shared with the user;
    generating, by a computer processor, a user secret key for the access structure and the set of user attributes, based on the master public key and the master secret key, the user secret key including a set of values in a vector e that satisfies a reconstruction function for reconstructing vector y, given lattice B, the user secret key being output for encrypting messages; and
    receiving a message m to be encrypted and generating an encrypted form of the message m to a predefined subset of attributes using the master public key.

8. The method of claim 7, comprising generating vector e such that eB=y, where eB is a multiplication of a vector with a lattice.

9. The method of claim 8 and further comprising selecting a random vector s and computing a value c for each given attribute in the predefined subset of attributes, the value c including a multiplication of random vector s with lattice B for the given attribute.

10. The method of claim 9 and further comprising computing a ciphertext for message m as an inner product of random vector s and y for the given attribute.

11. The method of claim 10 further comprising outputting the value c and the ciphertext as the encrypted form of message m.

12. The method of claim 11 and further comprising:
receiving the decrypted form of the message m and decrypting the encrypted form of the message m using the user secret key.

* * * * *